UNITED STATES PATENT OFFICE.

RUDOLPH BOEHRINGER, OF NEWARK, NEW JERSEY, ASSIGNOR TO STATEN ISLAND CHEMICAL CORPORATION.

SILICON COMPOUND AND PROCESS OF MAKING SAME.

1,205,509.     Specification of Letters Patent.     Patented Nov. 21, 1916.

No Drawing.     Application filed October 26, 1915. Serial No. 57,939.

*To all whom it may concern:*

Be it known that I, RUDOLPH BOEHRINGER, a citizen of the United States, and a resident of Newark, in the county of Essex and State of New Jersey, have invented certain new and useful Improvements in Silicon Compounds and Processes of Making the Same, of which the following is a specification.

My invention relates to silicon compounds suitable for the filtration, purification and softening of water and process for producing the same, and refers particularly to a compound of the class specified, containing among its constituents, an alkali-metal, silicon and boron, which is insoluble in water, suitable as a filtering medium, and which possesses the property of readily exchanging its alkali-metal base.

My invention also includes a process for the production of this new compound.

In the purification and softening of water by means of its passage through a filtering medium, it is essential for commercial purposes that the filtering medium be of such a physical character that it will allow of the rapid and uninterrupted flow of the water, and of such a chemical nature that it will readily and completely remove objectionable matters without the formation of soluble injurious materials to contaminate the water during its filtration. It is also desirable in a filtering medium for this purpose, that it be inexpensive and that its consumption during the process be of a minimum quantity. The silicon compound of my invention possesses all of these valuable qualities and in addition, the spent or exhausted material may be easily and cheaply reconverted into the original active compound suitable for re-use for the desired purpose.

The process of my invention comprises broadly in allowing a solution of an alkali-metal silicate to react upon a solution of borax, under such condition that the resulting product possesses the above described chemical and physical properties.

The following is an example of one method of carrying out my invention:—250 parts of a sodium silicate solution of about 40% is diluted with 750 parts water, and into the diluted solution thus formed, 120 parts of borax dissolved in 2000 parts of water are slowly added with constant stirring. In order to perfect the precipitation of the compound thus formed it is advisable that the solution should not contain too much free alkali, the presence of which may be overcome by the addition of the proper amount of acid, preferably sulfuric acid, until only a small amount of alkalinity remains. The formation of the precipitate is facilitated by slowly heating the mixture to 100° C. with constant stirring. The precipitate is then removed from the liquid, as by filtration, washed and dried and ground.

While I have not definitely determined the composition of this new compound, produced as above, the reactions incident to its formation are most probably:—

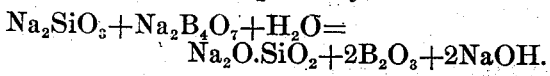

$$Na_2SiO_3 + Na_2B_4O_7 + H_2O = Na_2O \cdot SiO_2 + 2B_2O_3 + 2NaOH.$$

The new compound thus formed possesses the valuable property of easily exchanging its sodium for other bases, particularly calcium and magnesium, when brought into contact with solutions of their salts, and hence if a water containing calcium or magnesium salts be passed through a strata of my compound, the calcium and magnesium will replace the sodium, forming the insoluble calcium or magnesium salts of my compound and thus removing these objectionable ingredients from the water.

The proper calculated amount of potassium silicate may be substituted for the sodium silicate mentioned in the example. Further, the calcium and magnesium salts of my compounds can be readily re-converted into the sodium salt by treating them with a solution of an alkali-metal salt, for instance sodium chlorid, potassium chlorid or ammonium chlorid, thus allowing of the easy and inexpensive regeneration of the active chemical from the used or exhausted compound. Further, the compounds are insoluble in water, and do not form a gelatinous mass when brought into contact with water, and hence they are of such a physical character that they are suitable as filtering mediums.

I do not limit myself to the exact quantities of materials or method of procedure designated, all of which may be varied without going beyond the scope of my invention as described and claimed.

What is claimed, is:—

1. The process of producing a silicon compound which comprises mixing a solution of an alkali-metal silicate with a solution of borax, and removing and drying the precipitate formed.

2. The process of producing a silicon compound which comprises mixing a solution of sodium silicate with a solution of borax.

3. The process of producing a silicon compound which comprises mixing a solution of an alkali-metal silicate with a solution of borax in a weakly alkaline condition, and removing and drying the precipitate formed.

4. The process of producing a silicon compound which comprises mixing a solution of sodium silicate with a solution of borax in a weakly alkaline condition.

5. The process of producing a silicon compound which comprises reacting upon a solution of sodium silicate with a solution of borax in proportions and dilution to form a compound which when dried and ground is suitable for the removal of calcium and magnesium from water when used as a filtering medium.

6. As a new product, a silicon compound containing alkali-metal and boron having most probably the formula:—

$$X_2O.SiO_2.2B_2O_3,$$

in which X represents an alkali-metal and which is producible by the interaction of solutions of an alkali-metal silicate and borax.

7. As a new product, a silicon compound containing sodium and boron having most probably the formula:—

$$Na_2O.SiO_2.2B_2O_3,$$

producible by reacting upon sodium silicate with borax in a weakly alkaline aqueous solution, which silicon compound when dried and ground has the property of acting as a filtering medium, removing the calcium and magnesium from the calcium salts and magnesium salts dissolved in water passed through said filtering medium, by an interchange of the sodium in the silicon compound for the calcium and magnesium in the salts in solution in the water forming insoluble calcium and magnesium compounds of the silicon compounds.

Signed at Newark, in the county of Essex and State of New Jersey, this 20th day of October, 1915.

RUDOLPH BOEHRINGER.

Witnesses:
W. M. BROWN,
E. GARFIELD GIFFORD.